United States Patent [19]
Maruyama et al.

[11] Patent Number: 6,014,016
[45] Date of Patent: Jan. 11, 2000

[54] GENERATOR CONTROL DEVICE HAVING SIGNAL TERMINAL CONNECTED TO OUTSIDE CONTROL UNIT

[75] Inventors: Toshinori Maruyama, Anjo; Wakako Kanazawa, Toyokawa; Tadashi Uematsu, Kariya, all of Japan

[73] Assignee: Denso Corporation, Kariya, Japan

[21] Appl. No.: 08/901,205

[22] Filed: Jul. 28, 1997

[30] Foreign Application Priority Data

Aug. 1, 1996 [JP] Japan ..................................... 8-203971

[51] Int. Cl.[7] ...................................................... H02J 7/14
[52] U.S. Cl. ............................................... 322/28; 322/36
[58] Field of Search ................................. 322/28, 64, 29; 290/40 A

[56] References Cited

U.S. PATENT DOCUMENTS

| | | | |
|---|---|---|---|
| 4,636,706 | 1/1987 | Bowman et al. | 322/28 |
| 4,665,354 | 5/1987 | Sada et al. | 320/64 |
| 4,672,297 | 6/1987 | Gotoh et al. | 322/28 |
| 5,581,172 | 12/1996 | Iwatani et al. | 322/28 |
| 5,608,310 | 3/1997 | Watanabe | 322/29 |
| 5,629,606 | 5/1997 | Asada | 322/28 |
| 5,818,117 | 10/1998 | Voss et al. | 290/40 A |

FOREIGN PATENT DOCUMENTS

| | | |
|---|---|---|
| 720271A1 | 7/1996 | European Pat. Off. . |
| 60-109731 | 6/1985 | Japan . |
| 60-502285 | 12/1985 | Japan . |
| 7-39200 | 2/1995 | Japan . |

*Primary Examiner*—N. Ponomarenko
*Attorney, Agent, or Firm*—Pillsbury Madison & Sutro

[57] ABSTRACT

A generator control device disposed in a generator has a signal terminal to be connected to an outside control unit. The control device is composed of a voltage regulating circuit, a first circuit for controlling the regulating circuit according to a potential change of the signal terminal and a second circuit for changing potential level of the signal terminal according to a generator condition. The generator condition signal is transmitted through a signal wire to the outside control unit, and a switch-on signal of the ignition switch is sent to the control device through the signal wire from the outside control unit.

9 Claims, 4 Drawing Sheets

FIG. 4A  IC SWITCH 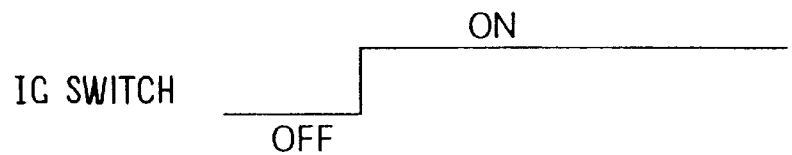
FIG. 4B  ENGINE OPERATION 
FIG. 4C  TERMINAL 10 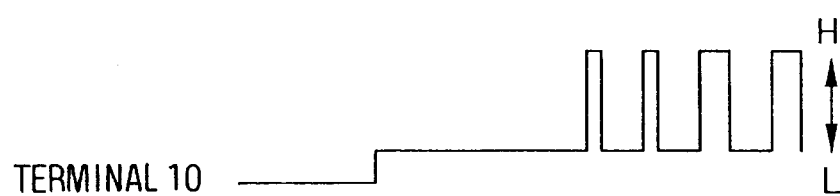
FIG. 4D  TERMINAL F 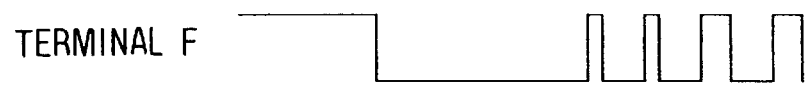
FIG. 4E  BATTERY VOLTAGE 
FIG. 4F  FR-SIGNAL 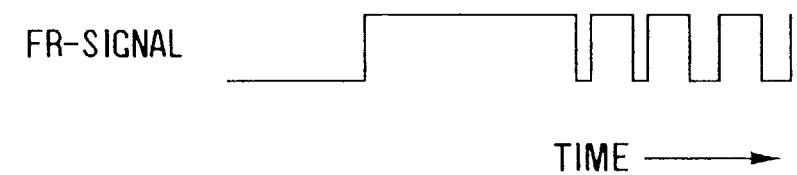
TIME ⟶

GENERATOR CONTROL DEVICE HAVING SIGNAL TERMINAL CONNECTED TO OUTSIDE CONTROL UNIT

CROSS REFERENCE TO RELATED APPLICATION

The present application is based on and claims priority from Japanese Patent Application No. Hei 8-203971, filed Aug. 1, 1996, the contents of which are incorporated herein by reference.

BACKGROUND OF THE INVENTION

1. Field of the Invention

The present invention relates to a vehicular generator having a control device which controls output voltage of the generator according to a command signal sent from a control unit disposed outside the generator.

2. Description of the Related Art

A control device including a voltage regulator for a vehicular generator is usually provided with a power terminal (B-terminal) connected to a high-side terminal of a rectifier of a generator, a ground terminal (E-terminal) connected to a low-side terminal, a phase voltage terminal (P-terminal) connected to a phase winding and an ignition terminal (IG-terminal) connected to the key switch of a vehicle. Such a control device may be provided with a terminal (FR-terminal) for sending generator condition to a control unit outside the generator and a terminal (C-terminal) for receiving a generator command signal from the outside control unit through a signal wire.

For example, U.S. Pat. No. 4,672,297 (or JPU 60-181200, the corresponding publication) proposes a control device for a vehicular generator in which the device sends a field-current signal to an outside control unit. A control device disclosed in JPA 60-109731 applies a battery voltage to a terminal of a charge lamp (L terminal) through the ignition switch of a vehicle and the lamp to detect turn-on of the ignition switch.

However, such a device is provided with various terminals, which necessitates considerable wiring works and wiring space.

Although the series connection of the lamp and the ignition switch disclosed in JPA 60-109731 may reduce cost, a failure of the lamp may cause trouble with the regulator operation.

SUMMARY OF THE INVENTION

Therefore, the present invention has an object of providing an improved control device, which is provided with a reduced number of terminals and wires, without decrease in the reliability of the generator control.

In a control device for a vehicular generator according to the present invention, a generator-condition signal is transmitted through a single signal wire and an ignition-switch-on signal is received from the outside control unit so that a terminal for the generator-condition signal can detect the switch-on-signal. Thus, the number of terminals and wires can be reduced. The generator-condition signal can be utilized for processing signals other than illumination of the lamp, and operation failure caused by break down of the lamp can be prevented.

The generator control device is used here to include not only a circuit for controlling the field current of the generator, but also an inverter circuit for controlling the output current of the generator. The generator-condition signal representing an operating state of the vehicle generator may include one or more of the output current of the generator, the output power, field current thereof, the field current, the duty ratio, or the conduction state of the field-current-control transistor, the battery charging voltage, the charging terminal voltage, the phase voltage of the stator, temperature of the generator, and an abnormal condition of the generator.

According to another feature of the present invention, the generator-condition signal represents an amount of power generated by the vehicular generator. The generated power can be detected by a control unit disposed outside the generator (vehicle-side control unit) so that the generator control becomes simple.

According to another feature of the present invention, the control device is operated when the potential of a transmitting and receiving terminal (T-R terminal) of the control device becomes higher than a preset value. Therefore, when the control device is operated, it is only necessary to turn on the ignition switch.

According to another feature of the present invention, a circuit for detecting power supply has a circuit for maintaining operation of the control device. Therefore, change in the potential level due to the transmission of the generator-condition signal through a signal wire and reception of an outside generator-control signal may not stop the operation of the control device.

According to another feature of the present invention, when the above turn-on signal and the generator-condition signal are transmitted or received, the generator control signal are transmitted through the T-R terminal of the control device from the vehicle-side control unit. Thus, the number of terminals and wires can be reduced. The above generator control signal includes a voltage for regulating the output voltage of the generator, an increasing or decreasing speed of the generated voltage, an on-off duty ratio of the generator output or the inverter thereof.

According to another feature of the present invention, a receiver circuit compares a voltage level of the generator output terminal with the reference voltage to detect a signal received from the vehicle-side or outside control unit. Because the reference voltage is changed in the same direction as the direction of change in the voltage level at the outside control unit, detection failure due to the change in transmitting conditions can be prevented. For this purpose, only the received voltage level or reference voltage level of the receiver circuit has to be changed, so that the circuit structure becomes simple and highly reliable.

According to another feature of the present invention, a field current signal is transmitted to a vehicle-side control unit and a reference level changing signal is received from the vehicle-side control unit so that the control device adjusts the generator output voltage according to the reference level changing signal. Thus, monitoring and controlling of the generator condition can be carried out by the vehicle-side control unit, which has a simple circuit structure.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 4A–4F are timing charts showing signals of various circuits shown in FIG. 3.

DETAILED DESCRIPTION OF CURRENTLY PREFERRED EMBODIMENTS OF THE INVENTION

Figure 1:
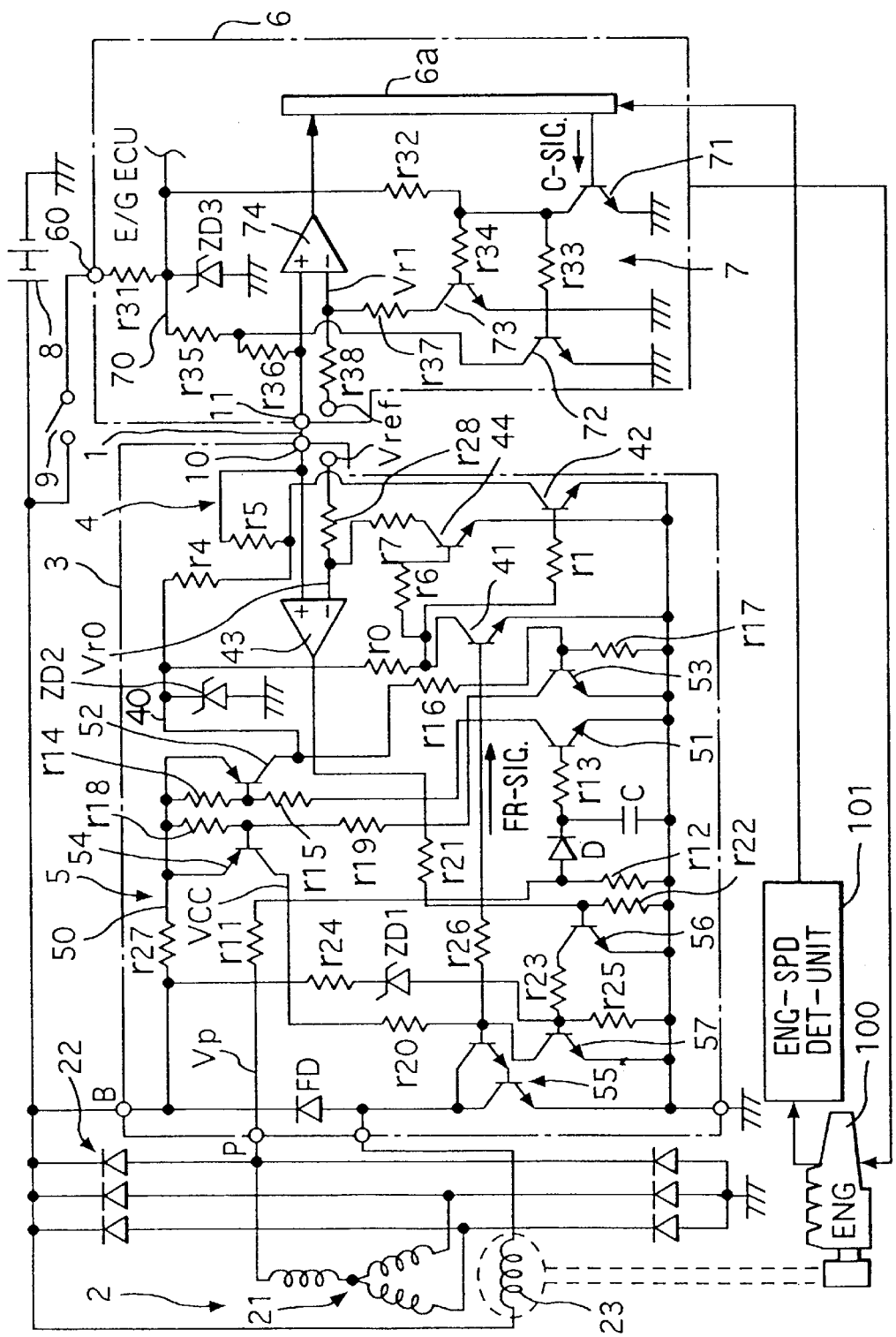
FIG. 1 is a circuit diagram showing a vehicular generating apparatus including a vehicular generator having a control device and a vehicle-side control unit according to a first embodiment of the present invention.

Currently, preferred embodiments are described with reference to the appended drawings.

A first embodiment of the present invention is described with reference to FIG. 1.

Reference numerals 1 and 2 are, respectively, a signal wire and a vehicular generator. A generator control device (or a voltage regulator) 3 is disposed in the generator 2 and includes a generator-side transmitter-receiver 4 and a field current control circuit 5. A vehicle-side or outside control unit (ECU) 6 is composed of a vehicle-side transmitter-receiver 7 and a microcomputer 6a. The signal wire 1 connects transmitter-receiver terminals (T-R terminals) 10 and 11.

The generator 2 is a three-phase synchronous generator (alternator), which has an armature coil 21, a rectifier 22 for rectifying the three-phase generated voltage, and a field coil 23.

The generator-side transmitter-receiver 4 includes a transmitter circuit, a receiver circuit, and a level changing circuit. The transmitter circuit is composed of an emitter-grounded transistor 41 whose collector is connected to an internal feed line 40 through a resistor r0, an emitter grounded transistor 42 whose base current is supplied from the collector of the transistor 41 through resistor r1 and resistors r4 and r5, which connect the collector of the transistor 42 to the feed line 40 and the T-R terminal 10, respectively. The feed line 40 is a high-side feed line. The resistors r4 and r5 form a pair of load elements of the transistor 42, which forms a switching element. The receiver circuit is composed of a comparator 43 which compares a signal voltage from the T-R terminal 10 with a reference voltage Vro. The level changing circuit is composed of an emitter-grounded transistor 44 whose base current is supplied from the collector of the transistor 41 through the resistor r6, a resistor r7 which connects the collector of the transistor 44 to the minus terminal of the comparator 43 and a resistor r28 which connects a terminal which provides a constant voltage Vref and the minus terminal of the comparator 43.

The field current control circuit 5 is composed of transistors 51–58, a flywheel diode FD, zener diodes ZD1 and ZD2, a diode D, a capacitor C, and resistors r11–r27.

A phase voltage Vp is divided by resistors r11 and r12, rectified by the diodes D, smoothed by the capacitor C and a resistor r13, and applied to the base of the emitter-grounded transistor 51. The collector voltage of the transistor 51 is connected to an internal feed line 50 through the resistors r14 and r15. The collector voltage of the transistor 51 is divided by the resistors r14 and r15 and applied to the base of a transistor 52, whose collector is grounded through resistors r16 and r17. The voltage divided by the resistors r16 and r17 is applied to the base of a transistor 53, whose collector is connected to the internal feed line 50 through the resistors r18 and r19. The collector voltage of the transistor 53 is divided by resistors r18 and r19 and applied to the base of an pnp transistor 54, whose collector voltage is applied to the base of a Darlington-connected transistor 55.

The output voltage of the comparator 43 is divided by resistors r21 and r22 and applied to the base of an emitter-grounded transistor 56, whose collector is connected to the base of an emitter-grounded transistor 57 through a resistor r23. The base of the transistor 57 is connected to a battery 8 through a resistor r24 and the zener diode ZD1, and is grounded through a resistor r25. The battery 8 is connected to the internal feed line 50 through a resistor r27. The internal feed line 40 is regulated to be 5 volts by the zener diode ZD2.

The vehicle-side transmitter-receiver 7 is composed of a constant voltage circuit including a resistor r31 and a zener diode ZD3, a transmitter circuit including transistors 71 and 72 and resistors r32–r36, a receiver circuit including a comparator 74, and a level changing circuit including a transistor 73 and resistors r37 and r38. A line including the ignition switch 9 is high-side power line, the resistors r35 and r36 form a pair of load elements of the transistor 72, which is a switching element.

The battery voltage is applied to a feed terminal 60 of the ECU 6 through the ignition switch 9. The feed terminal 60 is connected to an internal feed line 70 through a resistor r31. The zener diode ZD3 is connected to the feed terminal 70 to provide constant 5 volts. A reference voltage changing signal (C-signal) sent from the microcomputer 6a is applied to the base of an emitter-grounded transistor 71, whose collector is connected to the internal feed line 70 through a resistor r32. The collector of the transistor 71 is connected to the base of a transistor 72 through a resistor r33 and to the base of an emitter-grounded transistor 73 through a resistor 34. The collector of the transistor 72 is connected to the internal feed line 70 through a resistor r35 and to the transmitter-receiver terminal 11. The T-S terminals 10 and 11 of the generator-side control device 3 and the vehicle-side control unit 6 are connected by the signal wire 1. The collector of the transistor 73 is connected through a resistor r37 to the minus terminal of the comparator 74, whose positive terminal is connected to the transmitter-receiver terminal 11.

The negative terminal of the comparator 74 is supplied with the constant reference voltage Vref through a resistor r38. The resistances of the resistors r37 and r38 are set so that the minus terminal voltage Vr1 (reference level) of the comparator 74 lowers by a predetermined value when the transistor 73 is turned on.

Reference numerals 100 and 101 are an engine and an engine speed sensing unit, respectively. The detected engine speed signal is applied to the microcomputer 6a of the ECU 6.

The operation of the above-described circuit is described hereafter.

When the ignition switch 9 is turned on, the potential of the feed line 70 becomes 5 volts to drive the ECU 6. At this moment, the base current of the transistor 72 is supplied through the resistors r32 and r33 to prevent the potential of the signal wire 1 from rising. That is, the field current is not allowed to flow from the regulator 3.

When the engine is started and the engine speed increases, the engine speed sensing unit 101 sends the speed signal to the ECU 6. When the microcomputer 6a detects increase of the engine speed, it changes the C-signal to a high voltage level (high level). Thus, the transistor 71 is turned on to turn off the transistor 72, thereby raising the potential of the signal wire 1 via the resistors r35 and r36. This change in the potential level becomes a switch-on signal to be transmitted.

The potential rise of the signal wire 1 is transmitted to the internal feed line 40 of the regulator 3 through the resistors r5 and r4, so that the transistors 53 and 54 are turned on in sequence and the voltage of the internal feed line 50 is applied to the base of the transistor 55 through the transistor 54 and the resistor r20. The potential rise of the signal wire 1 makes the comparator 43 to provide the high level signal to turn on the transistor 56, which turns off the transistor 57, thereby turning on the transistor 55 to supply the field current to the field coil 23.

The potential rise of the internal feed line 40 turns on the transistor 42, through the resistors r0 and r1, as well as the transistor 53. The transistor 42 grounds a junction of the resistors r4 and r5 to lower the potential of the signal wire 1. When the base current of the transistor 55 is supplied through the transistor 54 caused by turning-on of the transistor 53, the transistor 41 is also turned on, which turns off the transistor 42. Accordingly, the decrease in the potentials of the internal feed line and the signal wire 1 due to the turning-on of the transistor 42 is dissolved in a short time, causing no problem in the operation.

When the transistor 41 is turned on, the transistor 44 is turned off to raise the reference voltage Vro of the minus terminal of the comparator 43, and the transistor 42 is also turned off to raise the potential of the signal wire 1 to the high level (5 volts). As a result, the comparator 74 receives the generator condition signal through the signal wire 1 and sends the high level signal (FR signal), which means "field current is being supplied", to the microcomputer 6a.

The generator phase voltage Vp is divided by the resistor r11 and r12, rectified by the diode D and smoothed by the capacitor C and the resistor r13 to be applied to the base of the transistor 51. When the output voltage Vp increases as the engine speed increases and reaches a voltage generated at a speed where the engine is started, the transistors 51 and 52 are turned on to connect the battery 8 with the internal feed line 40, which supplies current to the signal wire 1 and the base of the transistor 53. The transistor 52 keeps the connection between the internal feed line 40 and the battery 8 after the output voltage Vp is generated (after the transistor 51 is turned on). Thus, the circuit composed of the transistors 53 and 54 maintains the base current of the transistor 55. When the control device is switched on, the potential rise of the signal wire 1 closes the base circuit of the transistor 55, which is maintained after the generator is operated so that the transistor 55 can conduct the field current regardless of the change in the potential of the signal wire 1. When the transistor 42 is turned off, the generator-side T-R terminal 10 transmits the high level signal from the internal feed line 40 through the resistors r4 and r5 to the signal wire 1.

As the engine speed increases and the phase voltage Vp becomes higher, the zener diode ZD1 becomes conductive and the voltage drop of the resistor r25 becomes higher than 0.7 volts, thereby turning on the transistor 57. Consequently, the transistor 55 is turned off to cut the field current supplied to the field coil 23, and the transistor 41 is turned off, so that the transistors 42 and 44 are turned on. The turning-on of the transistor 42 lowers the potential level of the signal wire 1 by a dividing circuit composed of the resistors r35, r36 and r5, that is, from 5 volts to 2.3 volts, indicating that "field current is not supplied". Subsequently, such signal is applied to the comparator 74, which sends a low level signal to the microcomputer 6a. The zener diode ZD1 is connected for the level shift, and the transistor 57 is turned on or off according to the voltage drop of the resistor r25 or the voltage drop of the parallel circuit of the resistors r25 and r23. That is, the voltage drops are detected by the transistor 55. A higher reference voltage is set when the transistor 56 is turned off, while a lower reference voltage is set when the transistor 56 is turned on.

The operation of the comparator 43 is described hereafter. When the transistor 44 is turned on, the reference voltage Vro applied to the minus terminal of the comparator 43 is lowered to a value, which is obtained by dividing the constant voltage Vref at a ratio of the resistances of the resistors r28 and r7. The resistors are arranged so that the amounts and directions of a change in the potential of the signal wire caused by switching operation of the transistor 42 and a change in the reference voltage caused by the switching operation of the transistor 44 can be the same. Therefore, the potential change of the signal wire 1 during the transmission of the signals indicating supply of the field current may not affect the operation of the comparator 43.

The generator's ouput-voltage changing of the ECU 6 is described hereafter.

The ECU 6 lowers the generator's output voltage according to various engine-side conditions (e.g., vibration-damping control amount or accelerator depression amount) in order to reduce the engine load and, otherwise, raises the generator's output voltage. The generator's output voltage can be lowered if a battery-charge-level is high and raised if it is low. In this case, the battery charge level is obtained from the engine speed and the duty ratio of the field current.

When the reference voltage is lowered, the ECU 6 changes the C-signal to a low level, which is applied to the base of the transistor 71. Consequently, the transistor 71 is turned off to turn on the transistor 72, thereby grounding the junction of the resistors r35 and r36 to stop the power supply from the internal feed line 70 to the signal wire 1. The potential drop causes the comparator 43 to provide the low level signal so that the transistor 56 is turned off to raise the base potential of the transistor 57. Then, the transistor 57 is turned on and the transistor 55 is turned off to cut the field current, even if the battery voltage is low. That is, the reference voltage is shifted to the lower level.

When the generator's output voltage is changed to the high level, the ECU 6 changes the C-signal to the high level. Accordingly, the transistor 71 is turned on to turn off the transistor 72 so that the power is supplied from the internal feed line 70 to the signal wire 1. Thus, the comparator 43 provides the high level signal to turn on the transistor 56, so that the base potential of the transistor 57 lowers. As a result, the transistor 57 is not turned on to turn off the transistor 55 unless the battery voltage is high. That is, the generator's output voltage is changed to the high level. The change-over span of the generator's output voltages is decided by the resistances of the resistors r23, r24 and r25.

The potential change of the signal wire 1 caused by the switching operation of the transistor 72 or the operation of the vehicle-side transmitter-receiver 7 may, otherwise, cause fluctuation of the voltage level of the signal received by the comparator 74. The fluctuation is compensated in the same manner as the generator-side transmitter-receiver 4, as described hereafter.

The transistor 71 and the transistor 72 jointly turn on and off the transistor 73. That is, when the transistor 72 is turned on, the signal voltage level (on the plus terminal) received by the comparator 74 is lowered. At the same time, the transistor 73 is turned on to lower the reference voltage applied to the minus terminal of the comparator 74 to a voltage which is obtained by dividing the constant voltage Vref by a ratio of the resistances of the resistors r37 and r38. The resistors r37 and r38 are arranged so that the amounts and directions of a change in the potential of the signal wire 1 caused by switching operation of the transistor 72 and a change in the reference voltage caused by the switching operation of the transistor 72 can be the same. Therefore, the potential change of the signal wire 1 during the transmission of the signals indicating the field current supply may not affect the operation of the comparator 74.

Figure 2:
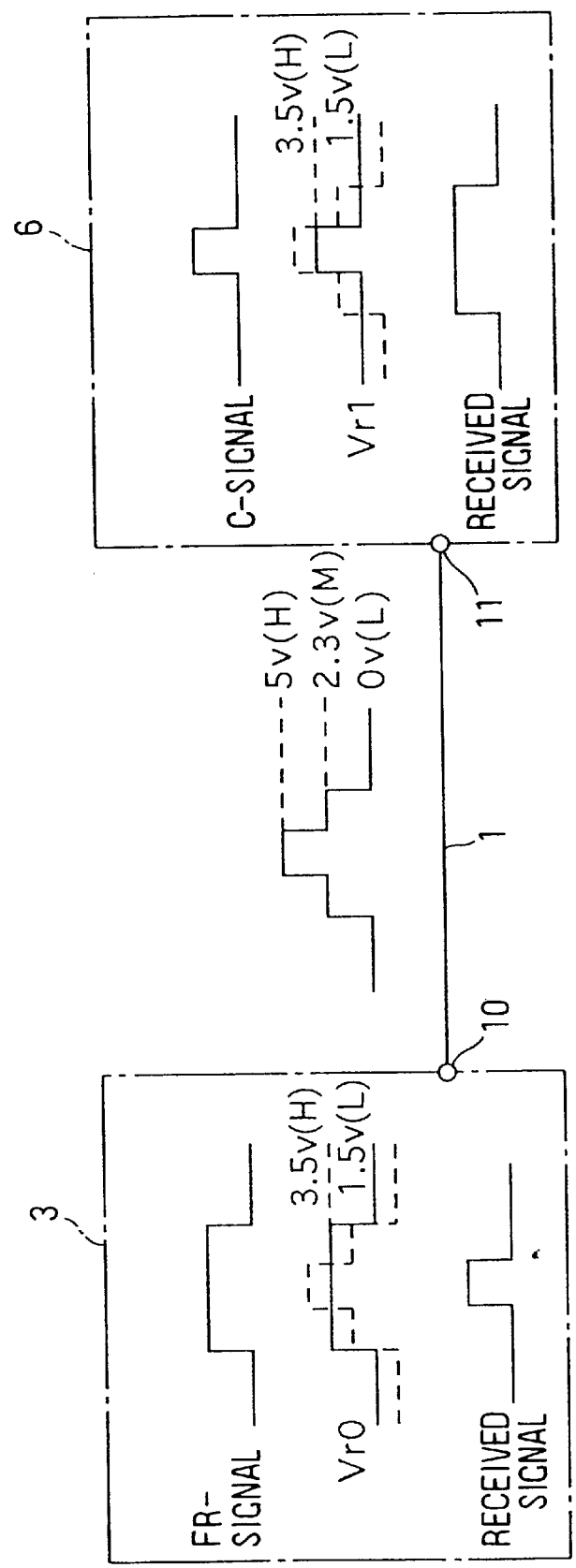
FIG. 2 is a signal chart showing signals of various circuits shown in FIG. 1.

As described above, the bi-level signals from the generator side and the bi-level signals from the vehicle-side are transmitted through the single signal wire surely. The bi-level-two-way transmitting system is described with reference to FIG. 2.

(a) When the field current is not supplied, the FR-signal is low, and the C-signal is low:

the transistors 42, 44, 72 and 73 are turned on, the potential of the signal wire 1 becomes 0 volt (L), the reference voltages vro and vr1 of the negative terminals of the comparators 43 and 74 become 1.5 volts (L) so that the comparators 43 and 74 can detect the low leveled FR-signal and C-signal without fail with a marginal voltage of 1.5 volt.

(b) When the field current is supplied, the FR-signal is high, and the C-signal is low:

the transistors 42 and 44 are turned off, the transistor 72 and 73 are turned on, the potential of the signal wire 1 becomes 2.3 volts (M) by the voltage dividing circuit composed of the resistors r4, r5 and r36, the reference voltages Vr1 of the negative terminals of the comparator 74 remains 1.5 volts (L) so that the comparator 74 can detect the high level signal of the FR-signal without fail with a marginal voltage of 0.8 volts, the reference voltage Vro of the negative terminal of the comparator 43 is raised to 3.5 volts (H) by turning-off of the transistor 44 so that the comparator 43 can detect that the potential of the signal wire 1 remains 2.3 volts (M) without fail with a marginal voltage of 1.2 volts.

(c) When the field current is supplied, the FR-signal is high, and the C-signal is high:

the transistors 42 and 44 are turned off, the transistor 72 and 73 are also turned off, the potential of the signal wire 1 becomes 5 volts (H), the reference voltages Vr1 of the negative terminals of the comparator 74 is raised to 3.5 volts (H) by turning-off of the transistor 73 so that the comparator 74 can detect the high level signal of the FR-signal without fail with a marginal voltage of 1.5 volts, the reference voltage Vro of the negative terminal of the comparator 43 is raised to 3.5 volts (H) by turning-off of the transistor 44 so that the comparator 43 can detect that the potential of the signal wire 1 is in the high level of 5 volts (H) without fail with a marginal voltage of 1.5 volts.

(d) When the field current is not supplied, the FR-signal is low, and the C-signal is high:

the transistors 42 and 44 are turned on, the transistor 72 and 73 are turned off, the potential of the signal wire 1 becomes 2.3 volts (M), such as the above (b), by the voltage dividing circuit composed of the resistors r35, r36 and r5, the reference voltage Vro of the negative terminal of the comparator 43 becomes 1.5 volts (L) by turning-on of the transistor 44 so that the comparator 43 can detect that the potential of the signal wire 1 is 2.3 volts and the reference voltage is in the high level without fail with a marginal voltage of 0.8 volts, the reference voltages Vr1 of the negative terminals of the comparator 74 is raised to 3.5 volts (H) by turning-off of the transistor 73 so that the comparator 74 can detect the low level signal of the FR-signal without fail with a marginal voltage of 1.2 volts.

Figure 3:
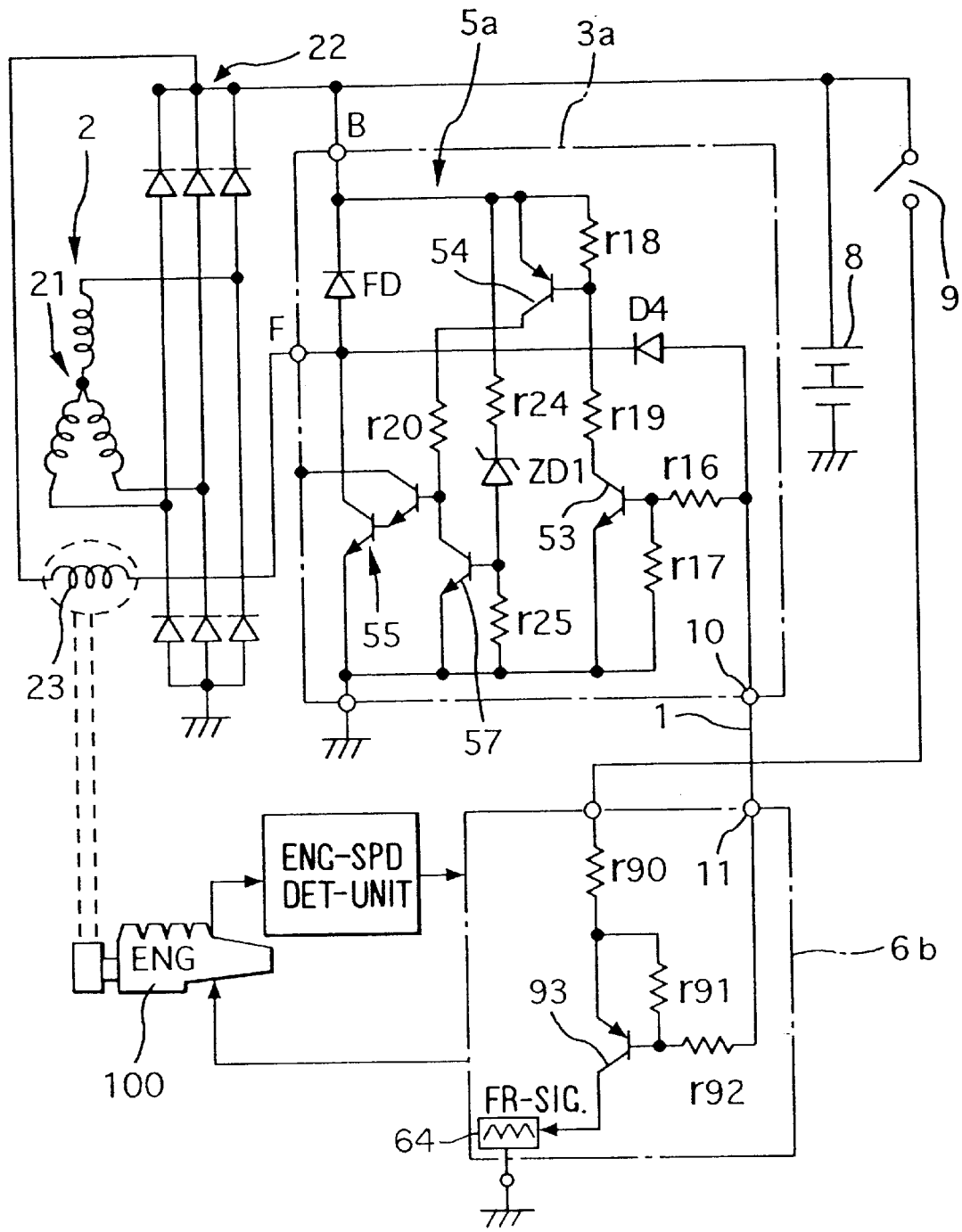
FIG. 3 is a circuit diagram showing a vehicular generating apparatus according to a second embodiment of the present invention.

Another embodiment is described with reference to FIG. 3.

The regulator 3 and the ECU 6 shown in FIG. 1 are replaced with simplified regulator 3a and ECU 6b. Elements of the regulator 3a having the same reference numeral as those shown in FIG. 1 are substantially the same with the function as those of the first embodiment except for a diode D4. On the other hand, the ECU 6b is provided with an npn transistor 93 which has the emitter connected to the battery through the ignition switch 9 and a resistor r90, a collector and base connected by a resistor 91. The base thereof is connected to the T-R-terminal 10 of the regulator 3a through a resistor r92 and the signal wire 1.

The operation of the above-described circuit is described hereafter.

When the ignition switch 9 is turned on, the battery voltage is applied to the resistors r90, r91, r92, the signal wire 1, the resistors r16 and r17 to raise the base of the transistor 53 by a voltage drop of the resistor 17, thereby turning on the transistor 53. If the battery voltage (B-voltage) is comparatively low, the zener diode ZD1 which is connected in series with the resistors r24 and r25 does not become conductive, and the transistor 57 is not turned on. Accordingly, the transistor 54, which is turned on by the transistor 53, turns on the transistor 55 to supply the field coil 23 with the field current. If the battery voltage is comparatively high, the zener diode ZD1 becomes conductive, and the voltage drop of the resistor r25 turns on the transistor 57, so that the transistor 55 turns off to cut the field current supplied to the field coil 23.

When the engine speed increases and the generator 2 increases the output current to raise the battery voltage, the zener diode ZD1 is turned on to raise the voltage drop of the resistor r25, thereby turning on the transistor 57, which turns off the transistor 55 to cut the field current.

While the generator is generating the output voltage, the ECU 6b supplies current to the T-R terminal 10 through the resistors r90, r91 and r92 and the signal wire 1. In more detail, when the transistor 55 is turned off, the potential of the signal wire 1 becomes high by a dividing ratio of a voltage dividing circuit composed of the resistors r90, r91 and r92 and resistors r16 and r17. When the transistor 55 is turned on, the potential of the signal wire 1 becomes 1.5 volts, which is the sum of the voltage drop (about 0.75 volts) of the Darlington transistor 55 and the forward voltage drop of the diode D4 (about 0.75 volts).

Accordingly, the on-state of the transistor 53 can be maintained by providing two resistors r16 and r17 having approximately the same resistances.

The potential level change of the signal wire 1 caused by the switching operation of the transistor 55 makes the transistor 93 of the receiver circuit of the ECU 6b turn on or off. When the transistor 55 is turned off and the potential of the signal wire 1 becomes near the battery voltage, the transistor 93 is turned off to provide the generator-condition-signal of 0 volt (FR-signal) across a resistor connected between the collector of the transistor 93 and a ground. On the other hand, when the transistor 55 is turned on and the potential of the signal wire 1 becomes 1.5 volts, the transistor 93 is turned on to provide the generator-condition signal of a certain volt (FR-signal) which is the difference between the battery voltage and the voltage drop of the resistor r90.

That is, both transmission of the turn-on signal to the regulator 3a and transmission of the generator-condition signal (FR-signal) indicating the field-current-supply from the regulator 3a to the ECU 6b can be carried out by the single signal wire 1.

According to the above-described embodiments, the following effects are expected.

First, a switch-on detecting circuit composed of the transistors 51–54 includes a function to maintain the operation of the generator control circuit after the turn-on signal is received. Therefore, the operations of the field-current control circuits 5 and 5a are not interrupted even if the potential level of the T-R terminal 10 changes due to the transmission of the generator-condition signal (FR-signal) or the reception of the generator control signal (C-signal).

The bi-level analog signals used in the above embodiments can be replaced with multi-level analog signals having multiple discrete voltage levels. PCM signals or digital signals using the bi-level analog signals can be also adopted.

In the previously described embodiments, only the reference levels are changed and the potential level change of the signal wire 1 during the transmission is compensated to detect the receiving signals. Instead, voltage levels of the receiving signals to be applied to the comparators can be changed. In such a case, a buffer circuit such as a voltage follower circuit should be inserted between the comparator and the signal wire 1 so that only the voltage of the receiving signal of the comparator can be changed. When the potential level of the signal wire 1 is raised by the receiver circuit, the voltage level of the receiving signal is lowered. On the other hand, when the potential level of the signal wire 1 is lowered by the receiver circuit, the voltage level of the receiving signal is raised Thus, the voltage level for the receiving signal is changed in a direction opposite to the direction of the voltage level change of transmitting signal. The voltage level of the receiving signal can be changed by selecting one of the output signals of comparators.

In the embodiments described above, the engine is started after the ignition switch is turned on, and the microcomputer 6a allows the generation by changing the C-signal to the high level signal so that the generating apparatus 3 supplies the field current of the vehicular generator 2. Therefore, the turn-on signal of the power source of the apparatus shown in FIG. 1 is transmitted after turning-on of the ignition switch. However, the microcomputer 6a can allow the generation by changing the C-signal to the high level signal concurrently with the turning-on of the ignition switch.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A generating system for a vehicle having an engine and an ignition switch, said system comprising:
   a generator which generates an output voltage;
   a generator control device having a field current control circuit and a transmitter-receiver terminal, and being disposed in said generator;
   a signal wire connected to said transmitter-receiver terminal; and
   a vehicle-side control unit, connected to said signal wire, which provides a signal which controls said field current control circuit according to said output voltage of said generator and operation of said ignition switch,
   wherein said generator control device comprises
      a receiver, connected between said field current control circuit and said transmitter-receiver terminal, which controls said field current control circuit according to a change in a potential level of said transmitter-receiver terminal; and
      a transmitter, connected between said field current control circuit and said transmitter-receiver terminal, which changes said potential level of said transmitter-receiver terminal according to a condition of said generator.

2. The generating system as claimed in claim 1, wherein said vehicle-side control unit comprises
   a vehicle-side transmitter-receiver terminal connected to said signal wire;
   a vehicle-side receiver circuit connected to said vehicle-side signal terminal which compares said potential level of said vehicle signal terminal with a reference level;
   a vehicle-side level changing circuit which changes said reference level in response to said change in said potential level of said vehicle-side transmitter-receiver terminal;
   a microcomputer which provides a generator control signal; and
   a vehicle-side transmitter circuit, connected to said microcomputer, which transmits said control signal by changing said potential level of said vehicle-side transmitter-receiver terminal.

3. A generator control device for controlling an output voltage of a generator according to said output voltage and an outside signal from outside said generator, comprising:
   a field current control circuit which generates a control signal;
   a transmitter-receiver terminal which transmits a signal relative to operation of said field current control circuit control signal to outside of said generator and which receives said outside signal;
   a receiver circuit connected to said field current control circuit and to said transmitter-receiver terminal, said receiver circuit controlling said field current control circuit according to said outside signal; and
   a transmitter circuit, connected to said field current control circuit and to said transmitter-receiver terminal, which transmits a signal relative to operation of said generator.

4. The generator control device as claimed in claim 3, wherein said transmitter circuit comprises a switching circuit, connected to said transmitter-receiver terminal, which changes a potential level of said transmitter-receiver terminal by switching operation in response to said output voltage of said generator.

5. The generator control device as claimed in claim 3, wherein said receiver circuit allows operation of said field current control circuit when a potential level of said transmitter-receiver terminal is higher than a preset value.

6. The generator control device as claimed in claim 3, wherein said receiver circuit comprises a circuit which maintains operation of said field current control circuit while said generator generates an output voltage, irrespective of a change in said potential level of said transmitter-receiver terminal.

7. The generator control device as claimed in claim 4, wherein said receiver circuit comprises:

a comparator, connected to said transmitter-receiver terminal, which compares said potential level of said transmitter-receiver terminal with a reference level; and a level changing circuit which changes said reference level of said comparator in response to a change in said potential level of said transmitter-receiver terminal.

8. The generator control device as claimed in claim 7, wherein said comparator has a first input terminal connected to said transmitter-receiver terminal and a second input terminal, said comparator being connected to said level changing circuit which provides said reference level according to said change in said output voltage of said generator.

9. The generator control device as claimed in claim 7, wherein said receiver circuit controls said field current control circuit according to said change in said potential level of said transmitter-receiver terminal.

* * * * *